United States Patent [19]

Bailey et al.

[11] 4,396,649
[45] Aug. 2, 1983

[54] EPOXY RESINS AND EMULSIONS MADE THEREFROM

[75] Inventors: Brian E. Bailey, Redbourne; Joseph W. Lister, Luton, both of England

[73] Assignee: Interox Chemicals Limited, London, England

[21] Appl. No.: 323,376

[22] Filed: Nov. 20, 1981

[30] Foreign Application Priority Data

Dec. 15, 1980 [GB] United Kingdom ............... 8040047

[51] Int. Cl.³ .................... C08G 59/64; C08G 59/42; C08G 59/50
[52] U.S. Cl. .................................. 427/386; 525/423; 525/438; 523/414; 523/415; 523/416; 528/111; 528/114; 528/121; 528/291; 528/341; 204/181 C
[58] Field of Search ............... 525/423, 438; 528/111, 528/114, 121, 291, 341, 361, 407; 204/181 C; 427/386

[56] References Cited

U.S. PATENT DOCUMENTS

| | | | |
|---|---|---|---|
| 2,994,673 | 8/1961 | Capron et al. | 528/111 X |
| 4,130,510 | 12/1978 | Tanaka et al. | 528/114 X |
| 4,296,231 | 10/1981 | Gutekunst et al. | 528/111 X |
| 4,308,085 | 12/1981 | Hörhold et al. | 528/111 X |
| 4,339,369 | 7/1982 | Micks et al. | 528/111 X |

*Primary Examiner*—Earl A. Nielsen
*Attorney, Agent, or Firm*—Larson and Taylor

[57] ABSTRACT

Tertiary nitrogen-containing chain-extended epoxy resins, capable of forming stable aqueous emulsions, may be produced by chain-extending an epoxy resin using a tertiary nitrogen containing ether or ester polyol for example, particularly, polycaprolactone which has been polymerization initiated by a tertiary amine polyol such as N-methyl diethanolamine. The corresponding amine salt is formed by treatment with an acid for example acetic acid and the resulting cationic polymer may be dispersed in water to form a cationic emulsion capable of being coated onto a substrate by electrodeposition. The chain extended resins, by virtue by their content of free epoxy groups are also usable for cross-linking and other uses.

18 Claims, No Drawings

EPOXY RESINS AND EMULSIONS MADE THEREFROM

This invention relates to epoxy resins and, more particularly, to novel tertiary nitrogen containing epoxy resins, to salts thereof and to aqueous emulsions made therefrom. By an "epoxy resin" is meant a resin based on the use of a polyepoxide, which term includes diepoxides, whether or not the resin in its final form contains epoxy groups.

Epoxy resins may be used in heat curable-surface coating compositions. Such compositions may find application in, for example, paint primers, equipment coatings, appliance finishes, can, drum and tank coatings and stoved finishes. Surface coatings based on epoxy resins tend to be unduly inflexible and, as a result, prone to chipping and flaking when the substrate to which they are applied is deformed. More flexible surface coatings based on epoxy resins may be produced by the use of chain extended polyepoxides. Chain-extension may be accomplished by adducting two or more polyepoxide molecules onto a polyol.

U.S. Pat. No. 4,104,147 relates to the production of water-dispersible chain-extended polyepoxides and to the use of the polyepoxides in surface coatings. The chain-extended polyepoxides are rendered water dispersible by reacting the free epoxy groups with a secondary amine to form a tertiary nitrogen group on the polyepoxide chain and converting the tertiary nitrogen to the amine salt form by treatment with acid. As a result of the cationic character of the thus treated polyepoxide it may be applied as a surface-coating by electrodeposition from an aqueous dispersion onto an anodic substrate. Surface coatings formed from the amine acid salt-containing chain-extended polyepoxide polymers of U.S. Pat. No. 4,104,147 are disclosed to have improved flexibility.

The chain-extended polyepoxides disclosed in U.S. Pat. No. 4,104,147 are subject to limitations of composition. The polyepoxides have relatively low, or no, epoxy functionality since the epoxy groups of the polyepoxide are utilised in the adduction of the secondary amine onto the polyepoxide. If a chain-extended polyepoxide having an appreciable residual epoxy functionality is required, for example for use in crosslinking, it may be necessary to limit the quantity of secondary amine used, thereby reducing the overall cationic character of the polyepoxide, and/or to limit the average molecular weight of the polyepoxide to ensure that a sufficiently high content of epoxy groups is present, thereby reducing the chain length.

According to the present invention there is provided a tertiary nitrogen-containing epoxy resin comprising a polyepoxide which has been chain-extended by means of a polyol, characterised in that the polyol is a tertiary nitrogen-containing ether or ester polyol, dispersible or emulsifiable cationic products produced by the acidification of the chain-extended polyepoxide, emulsions prepared from the cationic products and surface-coatings formed by the use of the emulsions.

According to the present invention the epoxide functionality of the polyepoxide need not be consumed in the course of the inclusion of the tertiary nitrogen groups in the chain-extended polyepoxide. However, the present invention is not limited to the entire content of tertiary nitrogen in the chain-extended polyepoxide being contained in the polyol used in the chain extension. It is envisaged that, preferably, more than 50% and, particularly preferably, more than 75% for example, desirably, more than 85% of the tertiary nitrogen content of the chain extended polyepoxide should be so provided.

The polyepoxide used in accordance with the present invention may be selected from polyglycidyl ethers and polyglycidyl esters. Preferably the polyepoxide is a polyglycidyl ether, particularly preferably a diglycidyl ether. Such ethers may be produced by the reaction under alkaline conditions and, usually, at a temperature of from about 75° C. to 175° C. between an epihalohydrin, preferably epichlorohydrin, and a polyol, preferably a diol. Suitably the polyol is a polyphenol such as, for example, resorcinol, pyrocatechol, hydroquinone, 1,4-dihydroxy naphthalene, bis-(4-hydroxyphenyl) methyl phenylmethane, bis-(4-hydroxyphenyl) tolyl methane, 4,4' dihydroxy diphenyl, bis-(4-hydroxy phenyl) sulphone or, particularly preferably, 4,4' dihydroxy diphenyl dimethylmethane (Bisphenol "A"). Alternatively the polyol may be an aliphatic polyhydric alcohol such as a glycol for example, ethylene glycol or glycerol. A polyglycidyl ester may be produced by the reaction between an epihalohydrin and a polycarboxylic acid, preferably a dicarboxylic acid.

The chain length of the polyepoxide may be controlled by control of the molar ratio of epihalohydrin to the number of hydroxyl or carboxyl groups in the polyol or polycarboxylic acid used in its production, an excess with reference to the number of hydroxyl or carboxyl groups favouring short chain polyepoxides and a deficiency favouring longer chain polyepoxides. The "epoxy equivalent" of a polymer; that is the weight in g of the polymer containing an equivalent of epoxide functionality; is an indication of chain length the lower the epoxy equivalent the shorter the chain length. The polyepoxide may suitably have an epoxy equivalent within the broad range of from about 160 to 9000, preferably, within the range of from 280 to 6750 and particularly preferably within the range of from 450 to 4000.

The chain extension of the polyepoxide according to the invention may be accomplished by mixing the polyepoxide and a suitable quantity of polyol at an elevated temperature. It is found that the polyol itself, by virtue of its content of tertiary nitrogen, tends to catalyse the chain extension. This effect is sufficient for most embodiments although under certain circumstances a separate catalyst may be found advantageous. A suitable separate catalyst is a tertiary amine such as, for example, benzyldimethylamine, triethylamine or tributylamine. The temperature during the chain extension is, preferably, from 60° C. to 200° C., particularly preferably from 100° C. to 200° C. The chain extension reaction may if desired be conducted in the presence of a solvent such as, for example, an aromatic hydrocarbon.

Preferably, the tertiary nitrogen containing polyol utilised according to the present invention is an ester polyol having the general formula

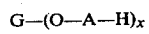

wherein G is a tertiary nitrogen containing organic radical with x free valencies, wherein x is at least 2 and A is a straight or branched chain polymeric entity containing a plurality of units, the same or different, selected from units having the general formula

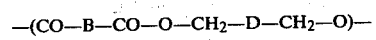

where B and D are straight or branched chain alkylene groups containing not more than 8 carbon atoms, or in the case of D is a chemical bond, and from units having the general formula

—(CO—E—CH$_2$—O)—    III where E is a straight or branched chain alkylene group having a chain length of from 4 to 9 carbon atoms and containing not more than 9 carbon atoms in total.

Suitably, in the compounds having the formula I, the entity A contains units having the general formula II which units may, suitably, be selected from ethylene glycol adipate polyesters, butylene glycol adipate polyesters and neopentyl glycol adipate polyesters and the corresponding sebacate and azelate polyesters.

Preferably, in the compounds having the formula I, the entity A contains and, particularly preferably, consists of linked units of the general formula III. Preferably the entity A is selected from polylactones, particularly preferably, from poly (epsilon caprolactones). Preferably the poly (epsilon caprolactones) are derived from epsilon caprolactones having the general formula

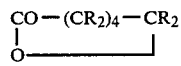    IV wherein R may represent an organic substituent such as, for example, a single ring aryl, an alkyl, an alkoxy or a single ring cycloalkyl substituent. Preferably, in at least 6 occurrences, R is hydrogen. Preferably, the total number of carbon atoms in all the occurrences of R is not more than 12. Particularly preferably, the entity A is unsubstituted poly (epsilon caprolactone) referred to merely as "polycaprolactone" herein.

Where, in the compounds having the formula I, the entity A is a polylactone, the tertiary nitrogen-containing ester polyol may be derived by the initiation of the ring opening polymerisation of the corresponding lactone by means of an active hydrogen containing initiator contained in the organic radical G identified above, in the presence of a suitable catalyst.

The ring opening of a lactone, such as, for example, caprolactone may be accomplished at temperatures of from about 20° C. to 200° C. and the catalyst preferred depends on the temperature selected. Preferably the ring opening is conducted at a temperature of from 120° C. to 200° C. and, particularly preferably, at from 125° C. to 185° C. When using the last mentioned range of temperatures the catalyst may, suitably, be an alkyl tin or an alkyl titanium compound, for example stannous octoate or dibutyl tin bisoctyl thioglycolate. Alternatively, when somewhat lower polymerisation temperatures are used, the catalyst may suitably be a Lewis acid for example, boron trifluoride, or a suitable organic acid. The quantity of catalyst is preferably from 0.001% to 1.0% particularly preferably from 0.005% to 0.2% by weight of the lactone.

The polymerisation initiator is, preferably, a compound containing two active hydrogen atoms so that the formation of two polyacetone chains is initiated by each molecule of initiator the tertiary nitrogen atom in the initiator thereby being positioned intermediate the ends of the resulting composite polylactone chain. An initiator containing three active hydrogen atoms may be advantageous in certain applications, for example where the polyepoxide is of a relatively low molecular weight. Initiators containing four or more active hydrogen atoms are not preferred since they tend to lead to viscosity problems.

In order to produce a polyol according to the definition I given above it is necessary that the organic radical G contain a nitrogen atom attached to three alkyl groups. This imposes a constraint on the selection of the polymerisation initiator. The use of an initiator containing active hydrogen atoms directly connected to a nitrogen atom, such as a primary amine, will result in the formation of an amide group including the nitrogen atom. If the initiator contains a further tertiary nitrogen atom this will be acceptable, however, since the resulting polyol will contain that tertiary nitrogen atom in addition to the amide groups. Suitably, therefore, the polymerisation initiator contains its active hydrogen atoms; which may be part of, preferably, amine or hydroxyl group; attached to the tertiary nitrogen atom through at least 1, for example from 1 to 10 and very suitably, for example 2 to 5 carbon atoms. Preferably, the tertiary nitrogen atom forms an integral part of the polyol chain.

Examples of suitable hydroxyl containing initiators are di- or tri alkanolamines in which the alkane portion contains suitable numbers of carbon atoms and which, in the case of di-alkanolamines contains an alkyl group of, for example, 1 to 10 carbon atoms. Examples of particularly preferred initiators are dialkanolamines such as N-methyl diethanolamine, N-ethyldiethanolamine, N-butyldiethanolamine, N-propyldiethanolamine, N-cyclohexyldiethanolamine, or N-phenyldiethanolamine, the corresponding homologues therof, such as for example, N-methyldipropanolamine or substituted derivatives thereof such as for example, N,4 methylcyclohexyl ethanolamine.

Alternatively, the initiator may be a compound containing two different active hydrogen containing functional groups such as amine and hydroxyl groups. In the general formula I given above the number of units A making up the polymeric entity may be selected, for example, by control of the ratio of molecules of initiator to molecules of lactone, to give the desired chain length having regard to the desired properties of the chain extended polyepoxide. The said number of units may be, suitably, up to 10 or more. Alternatively, the tertiary nitrogen containing ester polyol may have the general formula I given above wherein A is a monomeric entity consisting of a unit having the formula II or III given above. The production of such a compound may be achieved, for example, in the case where A has the formula III and is an epsilon caprolactone ring opening product by suitably limiting the quantity of epsilon caprolactone to correspond to 1 molecule per active hydrogen containing group on the initiator.

Alternatively the tertiary nitrogen containing ester polyol may have the general formula I given above where the valency x is partly satisfied by hydroxyl groups the number of —(O—A—H) radicals being reduced appropriately. An example of such a compound is that having the formula

HO—(CH$_2$)$_2$N(—CH$_3$)—(CH$_2$)$_2$—O—CO—(CH$_2$)$_4$—CH$_2$OH which may be obtained by the ring opening reaction of one molecule of N methyl diethanolamine with one molecule of epsilon caprolactone.

Alternatively the tertiary nitrogen containing polyol utilised according to the invention is an ether polyol.

Suitable tertiary nitrogen polyether polyols are oxyethylene compounds having the general formula $$R[(O(CH_2)_m]_nOH_x$$

where R is a di or polyvalent tertiary nitrogen containing group having the valency x and the value of m is from 2 to 4 and the value of n is from 1 upwards. Alternatively one or more of the valencies of the tertiary nitrogen-containing group R may be satisfied by a hydroxyl group.

The quantity of tertiary nitrogen containing polyol used to chain extend the polyepoxide may, suitably, be sufficient to provide one hydroxyl group for every two epoxy groups this being the theoretical quantity required to link the polyepoxide chains, on average, in pairs. If it is desired to leave a proportion of the polyepoxide not chain-extended, a lesser quantity may be used, for example down to 1 hydroxyl group for every 4 epoxy groups while still appreciably affecting the physical properties of the product. It is also envisaged that a larger quantity of polyol may be used up to the theoretical quantity required to react with all of the epoxy groups. In practice, however, it is envisaged that it would be preferred to utilise a quantity of polyol sufficient to provide one hydroxyl group for about every 1.5 to 3.0 epoxy groups.

The water dispersibility of the chain-extended polyepoxide depends in part, on the proportion of neutralisable nitrogen contained in it. The present invention is capable of giving contents of neutralisable nitrogen up to at least 6.0 m.eq/g of chain-extended polyepoxide. The proportion of neutralisable nitrogen in the chain-extended polyepoxide is preferably at least 0.15, and may suitably be above 0.75 or even above 3.0.m.eq/g. The proportion of neutralisable nitrogen depends in part on the molecular weight of the polyol and the epoxy equivalent of the polyepoxide.

The chain-extended polyepoxide, containing tertiary nitrogen atoms, may be converted into the salt form and rendered dispersible by treatment with a water-soluble acid in an aqueous medium. Either an organic acid or an inorganic acid may be used for example, formic acid, acetic acid or phosphoric acid. Preferably the pH of the aqueous medium is from 3 to 6.

The dispersible chain-extended polyepoxide products of the invention may be utilised as a surface coating material applicable from aqueous dispersion by electrodeposition.

The products of this invention also have utility by virtue of the possibility for a substantial content of residual epoxy groups therein which, at its maximum, is higher than that obtainable according to U.S. Pat. No. 4,104,147. These epoxy-containing products may be self-curing by reaction between epoxy groups and hydroxyl groups in the polyepoxide chain. Alternatively, epoxy-containing products may be cured at low temperatures, for example, at temperatures from 15° C. to 50° C. by reaction with polyamines, or at higher temperatures, by reaction with, for example, urea-formaldehyde resins, phenol formaldehyde resins, or melamine-formaldehyde resins. The aforementioned curing reactions may be conducted in aqueous dispersion to give products useful "inter alia" for metal coatings. In view of the above the present invention also particularly provides tertiary nitrogen containing polyepoxides containing more than 1 and preferably at least 1.5, for example up to 2, epoxy groups per molecule, and water-dispersible amine salts thereof.

The invention will now be illustrated by means of the following Examples.

Examples 1, 2, 4 and 9 show the preparation of tertiary nitrogen containing chain extended polyepoxides according to the invention. Examples 1 and 4 further prepare from the polyepoxide water thinnable dispersions in which the polyepoxide is present as a cationic species. Example 7 shows, for comparative purposes with reference to Example 4, the preparation of a nitrogen containing polyepoxide by a method not according to the invention and the preparation of a water thinnable dispersion in which the polyepoxide is present as a cationic species. Examples 3, 5, 6, 8 and 9 show the preparation of surface coatings from the chain extended polyepoxides produced in Examples 2, 4 and 7 (before conversion to cationic form) and 9. Table 1 shows the results of tests on the coatings of Examples 5, 6, 8 (comparative) and 9.

EXAMPLE 1

To a reaction vessel fitted with a stirrer, heat control means and a nitrogen purge were added 475 g of an epoxy resin having an epoxy equivalent of 475 available from the Shell Company under the Trade Name Epikote 1001, 140 g of a tertiary nitrogen containing polycaprolactone having an hydroxyl value of 198, (which had been prepared by heating together epsilon caprolactone and n-methyl diethanolamine in a 3.78 to 1 molar ratio at 155° C. in the presence of 6 ppm of dibutyl tin bis-octyl thioglycolate at a catalyst), and 0.5 g of benzyldimethylamine as a catalyst. The temperature was raised to 140° C. and was maintained at that level for 90 minutes, with stirring. The chain-extended polyepoxide product was cooled to 90° C. and was thinned with 147 g of 4-methyl pentan-2-one to form an amber solution. To 200 g of the chain-extended polyepoxide solution was added with vigorous stirring 6.4 g of glacial acetic acid followed by 149 g deionised water. The resulting product was a stable water-thinnable dispersion having a creamy texture.

EXAMPLE 2

Using the same procedure as in Example 1, and a reaction mixture of 380 g of an epoxy resin having an epoxy equivalent of 190 available from the Shell Company under the Trade Name Epikote 828, 225 g of the same polycaprolactone as in Example 1 and 0.5 g of the same catalyst as in Example 1, a tertiary nitrogen-containing chain-extended polyepoxide was prepared and thinned with 151 parts of the same solvent to form an amber solution.

EXAMPLE 3

200 g of the solution was mixed with vigorous stirring with 152 g of a 70% solution, in 4-methyl pentan-2-one, of a blocked isocyanate available from the Bayer Company under the Trade Name Desmodur AP Stabil. 9 g of glacial acetic acid followed by 230 g of deionised water was added to the mixture with further high speed stirring to form a water-thinnable dispersion having a creamy texture. Coatings of the dispersion were applied using wire wound bar application to steel panels which had been produced by the Bonderizing (Trade Mark) process and the coated panels were stoved at 180° C. for 20 minutes. The resulting cured films were glossy, hard and flexible.

EXAMPLE 4

To a reaction vessel fitted with a stirrer, heat control and nitrogen purge was added 790.4 parts by weight of polyepoxide available from Shell under the trade name Epikote 1001 and having en epoxy equivalent of 502 and 209.6 parts by weight of a 532 molecular weight polycaprolactone prepared from epsilon caprolactone and N-methyl diethanolamine in an approximately 4.5 to 1 molar ratio. The temperature was raised to 135° C. and the mixture was maintained at this temperature for one hour. The chain extended polyepoxide was then cooled to 90° C. before thinning with a solution of 23.6 parts by weight of glacial acetic acid in 405 parts by weight of xylene to give a stable aqueous dispersion.

EXAMPLE 5

200 parts by weight of the chain extended polyepoxide prepared in Example 4 were blended with 80 parts by weight of blocked aliphatic poly isocyanate available under the trade name Desmodur KL5 2544 from Bayer. This mixture was then dispersed in 270 parts by weight of deionized water using a high speed mixer. 0.4 parts by weight of a fluorocarbon flow agent available under the trade name FC 135 from 3M Company was added whilst stirring the dispersion. The dispersion had a viscosity of 30 seconds in a Ford 4 viscosity cup at 21° C. The dispersion was applied to Bonderized (trade name) steel panels and stoved for 30 minutes at 160° C., to give 15 micron thick coatings.

EXAMPLE 6

200 parts by weight of the chain extended polyepoxide prepared in Example 4 were blended with 86 parts by weight of blocked aromatic poly isocyanate available from Bayer under the trade name Desmodur AP Stabil 2170. This mixture was then dispersed in 270 parts by weight of deionized water using a high speed mixer. 0.4 parts by weight of fluorocarbon flow agent available from 3M Company under the trade name FC 135 was added whilst stirring the dispersion. The dispersion had a viscosity of 33 seconds in a Ford 4 viscosity cup at 21° C. The dispersion was applied to Bonderized steel panels and stoved for 30 minutes at 180° C., to give 15 micron thick coatings.

EXAMPLE 7

To a reaction vessel fitted with a stirrer, heat control and a nitrogen purge was added 791.5 parts by weight of the polyepoxide having an epoxy equivalent weight of 502 available from Shell Company as Epikote 1001 and 208.5 parts by weight of 529 molecular weight polycaprolactone diol available from Interox Chemicals Limited under the trade name Capa 200. 1 part by weight of benzyl dimethyl amine was added before raising the temperature to 140° C. This temperature was maintained for 3.5 hours before cooling to 90° C. To the resulting chain extended polyepoxide 57.5 parts by weight of diethylamine were added and a temperature of 90° C. maintained for 30 minutes. The resulting amine-terminated, chain extended polyepoxide resin was thinned with a solution of 47.3 parts by weight glacial acetic acid in 406 parts by weight xylene.

EXAMPLE 8

200 parts by weight of the chain extended polyepoxide prepared in Example 7 were blended with 86 parts by weight of blocked aromatic polyisocyanate, available from Bayer under the trade name Desmodur AP Stabil 2170. This mixture was then dispersed in 270 parts by weight of deionized water using a high speed mixer. 0.4 parts of weight of fluorocarbon flow agent available from 3M Company under the trade name FC 135 was added whilst stirring the dispersion. The dispersion had a viscosity of 34 seconds in a Ford 4 viscosity cup at 21° C. The dispersion was applied to Bonderized steel panels and stoved for 30 minutes at 180° C. to give 15 micron thick coatings.

EXAMPLE 9

To a reaction vessel fitting with a stirrer, heat control and nitrogen purge was added 866.5 parts by weight of the polyepoxide having an epoxy equivalent weight of 863 available from Shell under the trade name Epikote 1004 and 133.5 parts by weight of a 532 molecular weight polycaprolactone prepared from epsilon caprolactone and N-methyl diethanolamine. The temperature was raised to 135° C. and the mixture was maintained at this temperature for one hour. The chain extended polyepoxide was cooled to 80° C. and 428.6 parts by weight of a blocked aliphatic polyisocyanate available from Huls under the trade name B1065 was added. The mixture was stirred until homogeneous and was then poured into a tray and allowed to cool. The above polymer mixture was formed into coarse powder with the use of a macerator. This was followed by dry ball milling for 48 hours. An aqueous powder dispersion was prepared by grinding 200 parts by weight of the resulting powder with a solution of 2 parts by weight glacial acetic acid in 798 parts by weight deionized water in a ball mill for 16 hours. The resulting aqueus powder dispersion was applied by bar coater to Bonderized (trade name) steel panels and stoved for 30 minutes to give 25 micron coatings.

TESTS

The coatings produced in Examples 5, 6, 8 and 9 were subjected to tests for film hardness (by attempting to scratch the film with Staedtler pencil leads of increasing hardness until the hardest lead which did not penetrate the film was determined) reverse impact resistance (by using a Sheen Tester to allow a 4 lb (1.8 Kg) weight to fall onto the back of the panel the force, expressed in Kg. cm units, required to cause flaking of the coating being noted) and solvent resistance (by rubbing with a methyl ethyl ketone-soaked cloth for a number of double rubs required to remove the coating).

The results of the tests were as follows:

TABLE 1

| Test | Ex 5 | Ex 6 | Ex 8 | Ex 9 |
| --- | --- | --- | --- | --- |
| Reverse Impact | <180 | <180 | <180 | <180 |
| Solvent Resistance | 40 | 65 | 62 | 72 |
| Pencil Hardness | 2H | 3H | 3H | 3H |

We claim:
1. A composition comprising a tertiary nitrogen-containing epoxy resin comprising a polyepoxide which has been chained-extended by means of a polyol, characterised in that the polyol is a tertiary nitrogen-containing ester polyol having the general formula

$$G-(O-A-H)_x \qquad \text{I}$$

wherein G is a tertiary nitrogen-containing organic radical with x free valencies, wherein x is at least 2 and A is a straight or branched chain monomeric entity or a straight or branched chain polymeric entity said entity containing one or more units, the same or different, selected from units having the general formula $$-(CO-B-CO-O-CH_2-D-CH_2-O)- \qquad \text{II}$$

where B and D are straight or branched chain alkylene groups containing not more than 8 carbon atoms, or in the case of D is a chemical bond, and from units having the general formula $$-(CO-E-CH_2-O)- \qquad \text{III}$$

where E is a straight or branched alkylene group having a chain length of from 4 to 9 carbon atoms and containing not more than 9 carbon atoms in total.

2. A composition as claimed in claim 1 wherein in the ester polyol the entity A contains polylactone units having the general formula III.

3. A composition as claimed in claim 2 wherein the polylactone units having the general formula III are derived from epsilon caprolactones having the general formula

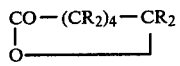

wherein R represents an organic substituent or a hydrogen atom and wherein R is a hydrogen atom in at least 6 occurances in the formula and wherein the total number of carbon atoms in all occurrences of R in the general formula is not more than 12.

4. A composition as claimed in claim 3 wherein in every occurrence in the general formula R is hydrogen.

5. A composition as claimed in claim 1 wherein the tertiary nitrogen containing organic radical G comprises an organic compound containing two or three active hydrogen atoms each and a tertiary nitrogen atom in which said active hydrogen atoms are replaced by the group —(O—A—H).

6. A composition as claimed in claim 5 wherein the active hydrogen atoms in the organic compound are contained in hydroxyl or amine groups.

7. A composition as claimed in claim 6 wherein the organic compound is a tri-alkanolamine or an alkyl di-alkanolamine.

8. A composition as claimed in claim 7 wherein the organic compound is an alkyl diethanolamine.

9. A composition as claimed in claim 1 wherein the number of units A in the expression—(OAH) in the formula I given above is up to 10.

10. A composition as claimed in claim 1 wherein the epoxy resin comprises a polyglycidyl ether or ester.

11. A composition as claimed in claim 10 wherein the polyglycidyl ether or ester has an epoxy equivalent of from 280 to 6750.

12. A composition as claimed in claim 1 wherein the ratio of the quantity of the tertiary nitrogen containing polyol to that of the polyepoxide is such as to provide 1 hydroxyl group of the polyol for every 1.5 to 4 epoxy groups of the polyepoxide.

13. A composition as claimed in claim 1 wherein the chain extended polyepoxide contains from 0.15 to 6.0 m.eq of neutralisable nitrogen per g.

14. A composition as claimed in claim 1 wherein the claim extended polyepoxide is in the form of an amine salt.

15. A composition as claimed in claim 14 in the form of an aqueous emulsion of the amine salt.

16. A process for the formation of a surface coating comprising a chain extended polyepoxide comprising electrodepositing said polyepoxide from an aqueous emulsion as claimed in claim 15 onto the surface.

17. A process for the formation of a surface coating comprising applying a chain extended polyepoxide as claimed in claim 1 onto a surface and curing the polyepoxide by the reaction of residual epoxy groups therein with a cross-linking agent.

18. A surface coating prepared by the process claimed in claim 16 or 17.

* * * * *